Oct. 28, 1947.     L. B. JONES     2,429,817
HOT BEARING BOX DETECTION MEANS
Filed Nov. 4, 1944     2 Sheets-Sheet 1
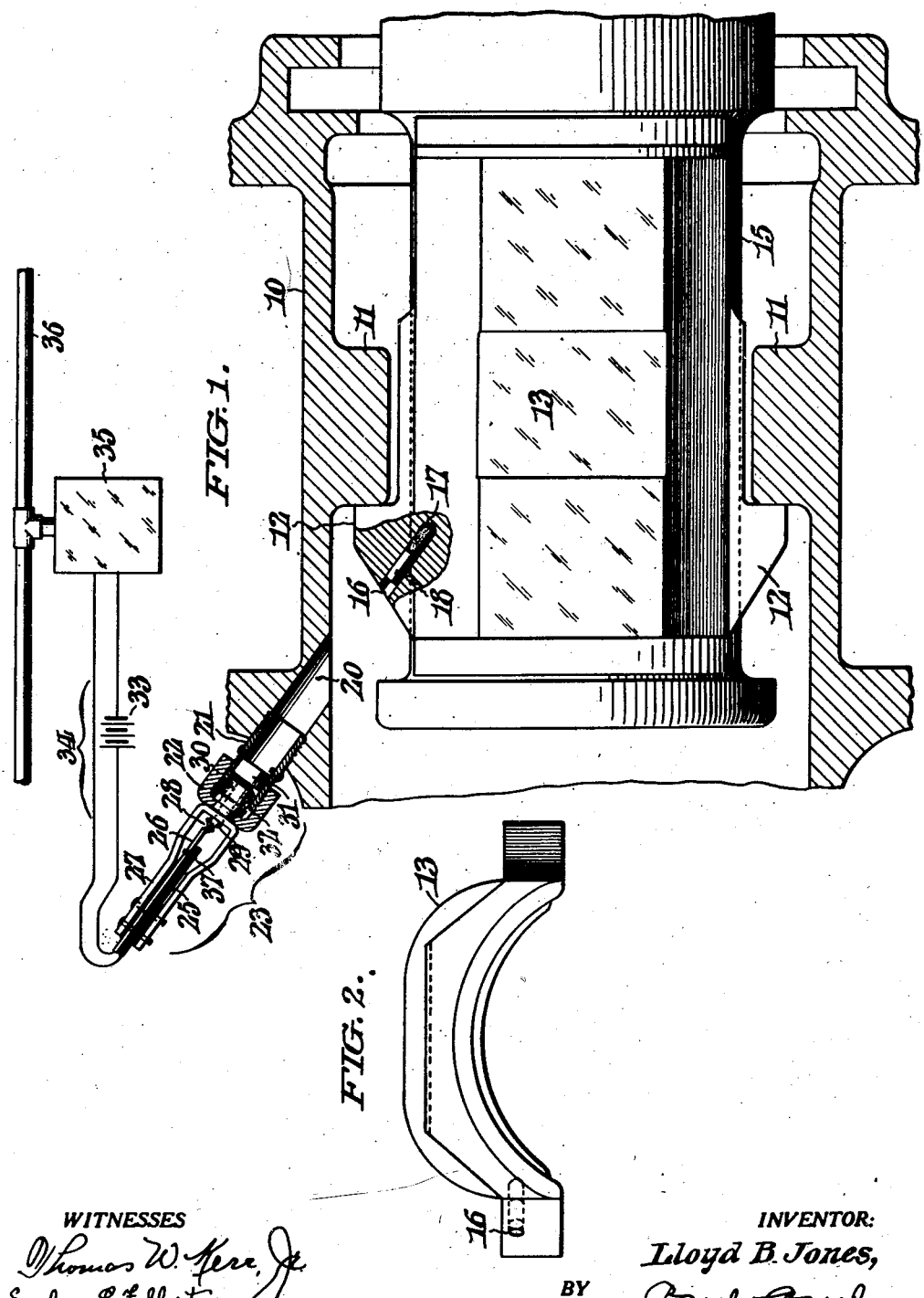
WITNESSES
INVENTOR:
Lloyd B. Jones,
BY
ATTORNEYS.

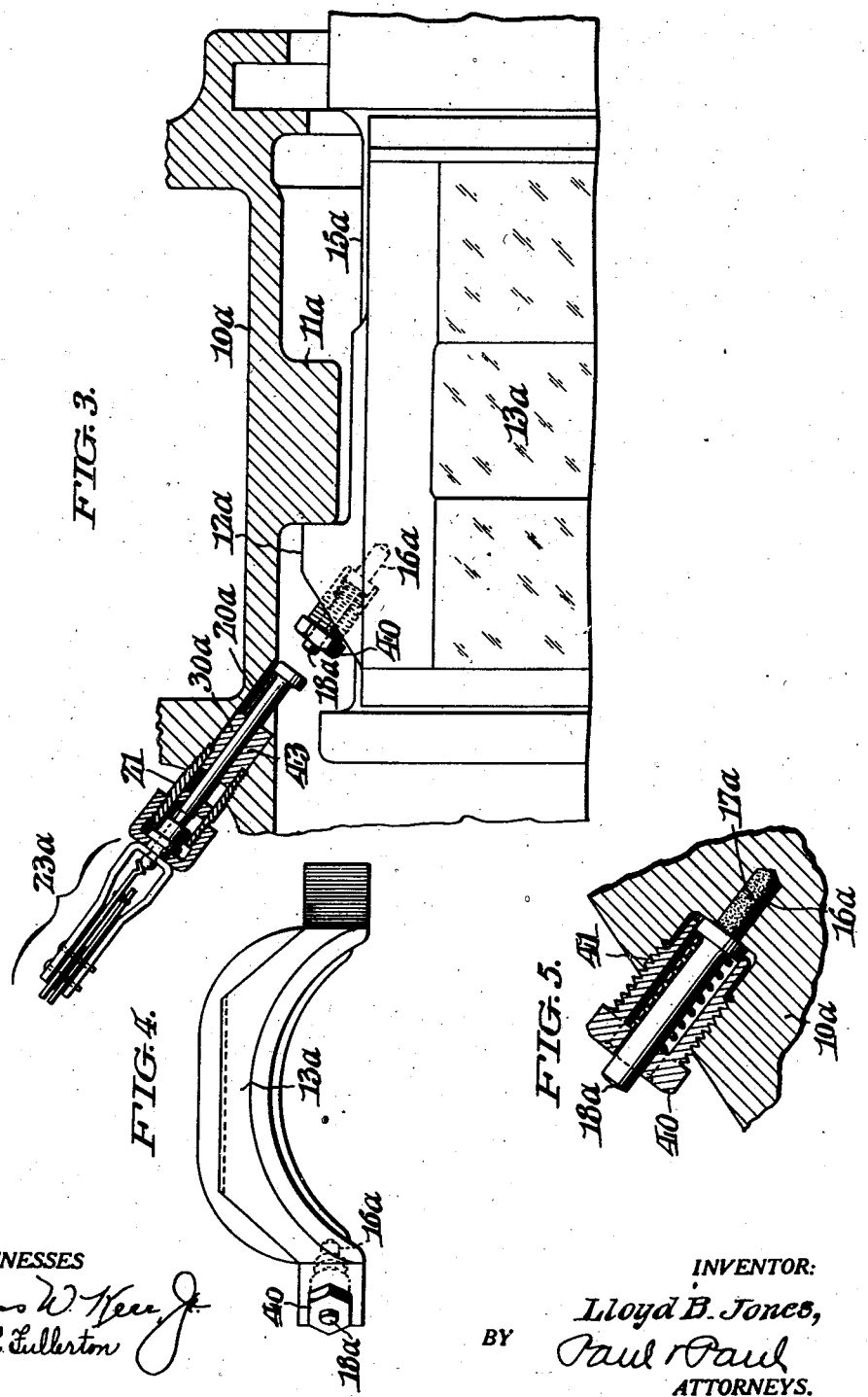

Patented Oct. 28, 1947

2,429,817

UNITED STATES PATENT OFFICE 2,429,817

HOT BEARING BOX DETECTION MEANS

Lloyd B. Jones, Hollidaysburg, Pa., assignor to The Pennsylvania Railroad Company, Philadelphia, Pa., a corporation of Pennsylvania Application November 4, 1944, Serial No. 561,852

8 Claims. (Cl. 177—311)

This invention relates to detection means useful in connection with the bearings for shafts or axles, particularly the journal boxes of railroad vehicles to indicate overheating due to depletion of the lubricant in such boxes.

The chief aim of my invention is to provide a simple and reliable detector means of the kind referred to which is capable of ready incorporation in the journal boxes at a minimum cost; which allows ready replacement of the bearing plates or "brasses" of the boxes when necessary without requiring dismantling and which does not in any way interfere with the normal operation of the journals.

Other objects and attendant advantages will appear from the following detailed description of the attached drawings, wherein Fig. 1 is a horizontal section of a standard type of a car axle journal box with incorporated detection means conveniently embodying my invention in one form.

Fig. 2 is an end elevation of the brass of the journal box of Fig. 1 as modified for the purposes of my invention.

Fig. 3 is a fragmentary view generally like Fig. 1 showing an alternative embodiment of my invention.

Fig. 4 is an end view of the brass of the journal box illustrated in Fig. 3; and Fig. 5 is a fragmentary sectional view on a larger scale showing to better advantage an important detail of the alternative detection means.

With more specific reference first more especially to Figs. 1 and 2 of these illustrations, the numeral 10 generally designates the housing of the railroad axle journal box, which, as hereinbefore noted, is of standard design and construction. As usual, the housing 10 is provided with stop lugs 11 which extend inwardly from opposite side walls of said housing for engagement by the lateral projections 12 at the contiguous sides of the brass which is indicated at 13 and with which the journal 15 of the wheel axle directly contacts.

In carrying out my invention I provide in one of the projections 12 of the brass 13 an inclined cavity or bore 16, and, after placing a charge 17 of explosive in the bottom of said bore, insert a closure slug 18 over said charge, which, as later on explained, serves as a projectile. In addition I drill a hole 20 into one of the side walls of the journal box 10 in direct axial alignment with the bore 16 in the brass for connection of a screw nipple 21. Attached to the outer end of the nipple 21 is a thimble 22 which supports a jack switch 23 generally resembling those ordinarily employed in telephony, having normally closed spring contact elements 25 and 26 whereof the outer ends are secured, with interposition of insulation between them and the corresponding ends of a supporting yoke 27 affixed to said thimble. At its inner end, the spring contact 26 extends beyond its mate 25 and is there formed with a V-cam projection 28 which lies in the path of an impact element in the form of the ball head 29 on the stem 30 of a plunger 31 guided within the nipple 21. As shown, the plunger stem 30 is confined to axial movement in a fixed sleeve 32 suitably incorporated with the thimble 22. The jack switch 23 is connected with a battery or other source of electric current 33 in a circuit 34 which, upon being opened, may operate a suitable indicator means herein shown by way of example as having the form of an electro magnetic relief valve 35 interposed in the brake line 36 of the car.

In the event that the journal box becomes overheated upon exhaustion of lubricant or from other cause, the slug 18 will be forcibly ejected from the recess 16 in the brass 13 upon firing of the explosive charge 17, and in its flight will enter the nipple 21 and strike the impact plunger 31. As a consequence, through cooperation of the ball head 29 of the plunger stem 30 with the cam end of the spring 26, the contacts at 37 will be separated and thereby open the circuit with resultant actuation of the relief valve 35 to effect automatic operation of the car brakes, said contacts being thereafter so held through engagement of the projection 28 on the element 26 in the groove immediately behind the head 29 on said plunger stem for maintenance of the indicating means in continuous operation until the fault in the bearing is corrected.

In the alternative embodiment of my invention illustrated in Figs. 3, 4 and 5, a spring-biased plunger 18a serves as a projectile in lieu of the slug of the first described embodiment. As shown, the plunger 18a is guided for axial movement in a gland-like element 40 which is screwed into a tapped enlargement 41 of the bore 16a, its stem passing outward through an axial aperture in the nut head 40 of said element. The switch 23a is identical with that of Fig. 1 except in that its impact plunger 30a is extended to pass through an axial guide opening in a plug 43 fitting into the inner end of the nipple 21. In order to preclude the necessity for repetitive description all the other component members of the switch 23a, not specifically referred to but having their counterparts in the first described embodiment, are identified by the same numbers previously used, with addition in each instance, however, of the letter "a" for the purposes of ready distinction.

In both instances, the explosive charge is of such character that it will fire only within a definite temperature range well beyond that to which the journal boxes are heated in ordinary service during the summer months. In both instances, moreover, it is to be noted that the construction is extremely simple and allows ready removal and replacement of the bearing brasses without undergoing derangement.

While for convenience of exemplification herein I have shown and specifically described a brake applying system as the detecting means, it is of course to be understood that other types of detecting or signal means including audible alarms such as bells or whistles and visible alarms such as lamps capable of control by an electric circuit, may be employed instead. The alarm devices may be located directly in the car of which the journal boxes are to be protected and a single device provided for each journal, or the alarm may be transmitted to the engineman's cab by means of the train air signal system. It is also feasible within the scope of certain of the appended claims that mechanical means operative by a projectile may be substituted in lieu of the electric means herein shown if this should be found to be desirable or more convenient in practice.

Having thus described my invention, I claim:

1. A hot axle bearing detecting system comprising a projectile element which is recessed with an underlying explosive charge into a cavity in a portion of the bearing having direct contact with the shaft; an indicating means; and actuating mechanism supported by a wall of the bearing and including an impact element in the path of the projectile element for causing actuation of the indicating means upon firing of the explosive charge.

2. The invention according to claim 1, wherein the actuating mechanism further includes a pair of electric contacts arranged to be operated by the impact element; and means in circuit with the contacts for operating the indicating means.

3. The invention according to claim 1, wherein the impact element has the form of a plunger which is confined to endwise movement within a tubular guide fitting set into a wall of the bearing in axial alignment with the projectile element.

4. The invention according to claim 1, wherein the projectile element has the form of a spring-biased plunger with guidance in a tubular fitting set into the recess for the explosive charge.

5. A hot journal box detecting system comprising a projectile element which is recessed with an underlying explosive charge into a cavity in the brass of the journal box; an indicating means; and actuating mechanism supported by a wall of the box and including an impact element in the path of the projectile element for causing actuation of the indicator upon firing of the explosive charge.

6. The invention according to claim 5, wherein the actuating mechanism further includes a pair of electric contacts arranged to be operated by the impact element; and means in circuit with said contacts for operating the indicating means.

7. The invention according to claim 5, wherein the impact element has the form of a plunger which is confined to endwise movement within a tubular guide fitting set into the wall of the journal box in axial alignment with the projectile element.

8. The invention according to claim 5, wherein the projectile element has the form of a spring biased plunger with guidance in a tubular fitting set into the recess of the brass containing the explosive charge.

LLOYD B. JONES.

REFERENCES CITED

The following references are of record in the file of this patent:

UNITED STATES PATENTS

| Number | Name | Date |
| --- | --- | --- |
| 419,902 | Wider | Jan. 21, 1890 |
| 986,279 | Griffith | Mar. 7, 1911 |
| 1,199,654 | Bailey | Sept. 26, 1916 |
| 1,239,450 | Banneyer | Sept. 11, 1917 |
| 2,100,183 | Cowan | Nov. 23, 1937 |